US008168542B2

(12) United States Patent  
Chen et al.

(10) Patent No.: US 8,168,542 B2  
(45) Date of Patent: *May 1, 2012

(54) METHODS OF FORMING TUBULAR OBJECTS

(75) Inventors: Kuan-Neng Chen, White Plains, NY (US); John Christopher Arnold, North Chatham, NY (US); Niranjana Ruiz, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 874 days.

This patent is subject to a terminal disclaimer.

(21) Appl. No.: 11/968,771

(22) Filed: Jan. 3, 2008

(65) Prior Publication Data

US 2009/0176040 A1 Jul. 9, 2009

(51) Int. Cl.  
*H01L 21/311* (2006.01)

(52) U.S. Cl. .......................... 438/694; 438/696

(58) Field of Classification Search .................. None  
See application file for complete search history.

(56) References Cited

U.S. PATENT DOCUMENTS

| 4,419,809 | A | 12/1983 | Riseman et al. |
|---|---|---|---|
| 4,705,597 | A * | 11/1987 | Gimpelson et al. ........... 438/701 |
| 4,803,181 | A | 2/1989 | Buchmann et al. |
| 5,801,088 | A | 9/1998 | Gardner et al. |
| 6,124,174 | A | 9/2000 | Gardner et al. |
| 6,566,280 | B1 | 5/2003 | Meagley et al. |
| 7,112,508 | B2 | 9/2006 | Rhodes et al. |
| 2001/0006242 | A1 | 7/2001 | Kwak et al. |
| 2005/0221513 | A1 * | 10/2005 | Yue et al. .......................... 438/14 |
| 2006/0063364 | A1 * | 3/2006 | Stephens et al. .............. 438/585 |
| 2007/0134922 | A1 | 6/2007 | Mori et al. |
| 2007/0190713 | A1 | 8/2007 | Doris et al. |
| 2009/0176062 | A1 | 7/2009 | Chen et al. |

* cited by examiner

*Primary Examiner* — Duy Deo  
(74) *Attorney, Agent, or Firm* — Vazken Alexanian; Ryan, Mason & Lewis, LLP

(57) ABSTRACT

A tubular object is fabricated by a method comprising the steps of providing a first layer, forming a second layer on the first layer, and then patterning the second layer to form a raised feature with one or more sidewalls. Subsequently, the first layer is processed such that components of the first layer deposit on the one or more sidewalls of the raised feature.

19 Claims, 4 Drawing Sheets

METHODS OF FORMING TUBULAR OBJECTS

FIELD OF THE INVENTION

The present invention is directed generally to tubular objects such as nanotubes, and, more particularly, to methods of forming tubular objects.

BACKGROUND OF THE INVENTION

A nanotube typically comprises a tubular object with extremely thin sidewalls. The sidewalls of such an object may, for example, only consist of a single monolayer of material. Nevertheless, the nanotube itself may have a width or diameter of several nanometers and may be several microns long. Although carbon-based nanotubes have received the most attention, nanotubes have also been made out of several other materials including boron nitride and various metal oxides.

Tubular objects such as nanotubes are of interest because of their unique mechanical properties and their potential for use in applications like energy storage, medicine, electronics, materials, optics, and micro-electromechanical systems (MEMS). However, most of these applications require tubular objects with physical properties that are adapted to a particular purpose. As a result, there is a need for new methods of forming tubular objects that allow physical properties such as length, width (or diameter), cross-sectional shape, and sidewall thickness to be precisely controlled.

SUMMARY OF THE INVENTION

Embodiments of the present invention address the above-identified need by providing methods of fabricating tubular objects. Advantageously, these embodiments allow the physical properties of a tubular object to be easily adapted to a particular purpose.

In accordance with an aspect of the invention, a tubular object is fabricated by a method comprising the steps of providing a first layer, forming a second layer on the first layer, and then patterning the second layer to form a raised feature with one or more sidewalls. Subsequently, the first layer is processed such that components of the first layer deposit on the one or more sidewalls of the raised feature.

In accordance with one of the above-identified embodiments of the invention, a layer of tantalum silicon nitride ("TaSiN") is deposited on a dielectric layer. Subsequently, a layer of photoresist adapted for use in electron-beam lithography is deposited on the layer of TaSiN. The layer of photoresist is then patterned by electron-beam lithography to form a matrix of raised features on the layer of TaSiN, each raised feature having one or more sidewalls depending on its shape. The layer of TaSiN is then exposed to an anisotropic etching process, causing components of the TaSiN to deposit on the sidewalls of the raised features. Removing the raised features results in a matrix of tubular objects on the dielectric layer.

Advantageously, the above-described method embodiment produces tubular objects whose placement and physical properties are easily tailored to different applications. Moreover, the method may produce tubular objects that are resistant to damage from subsequent etching processes.

These and other features and advantages of the present invention will become apparent from the following detailed description which is to be read in conjunction with the accompanying drawings.

DETAILED DESCRIPTION OF THE INVENTION

This invention will be illustrated herein in conjunction with an exemplary method of forming tubular objects. Such tubular objects may be used in a range of applications including, but not limited to, energy storage, medicine, electronics, materials, optics, and MEMS. It should be understood, however, that the invention is not limited to the particular materials, features, processing steps, and applications shown and described herein. For example, even though the illustrative embodiments described herein are directed to forming tubular objects using semiconductor processing techniques, tubular objects manufactured using other techniques may also fall within the scope of the invention. Modifications to the illustrative embodiments will be apparent to those skilled in the art.

It should also be understood that the various layers and/or regions shown in the accompanying figures may not be drawn to scale.

Figure 1:
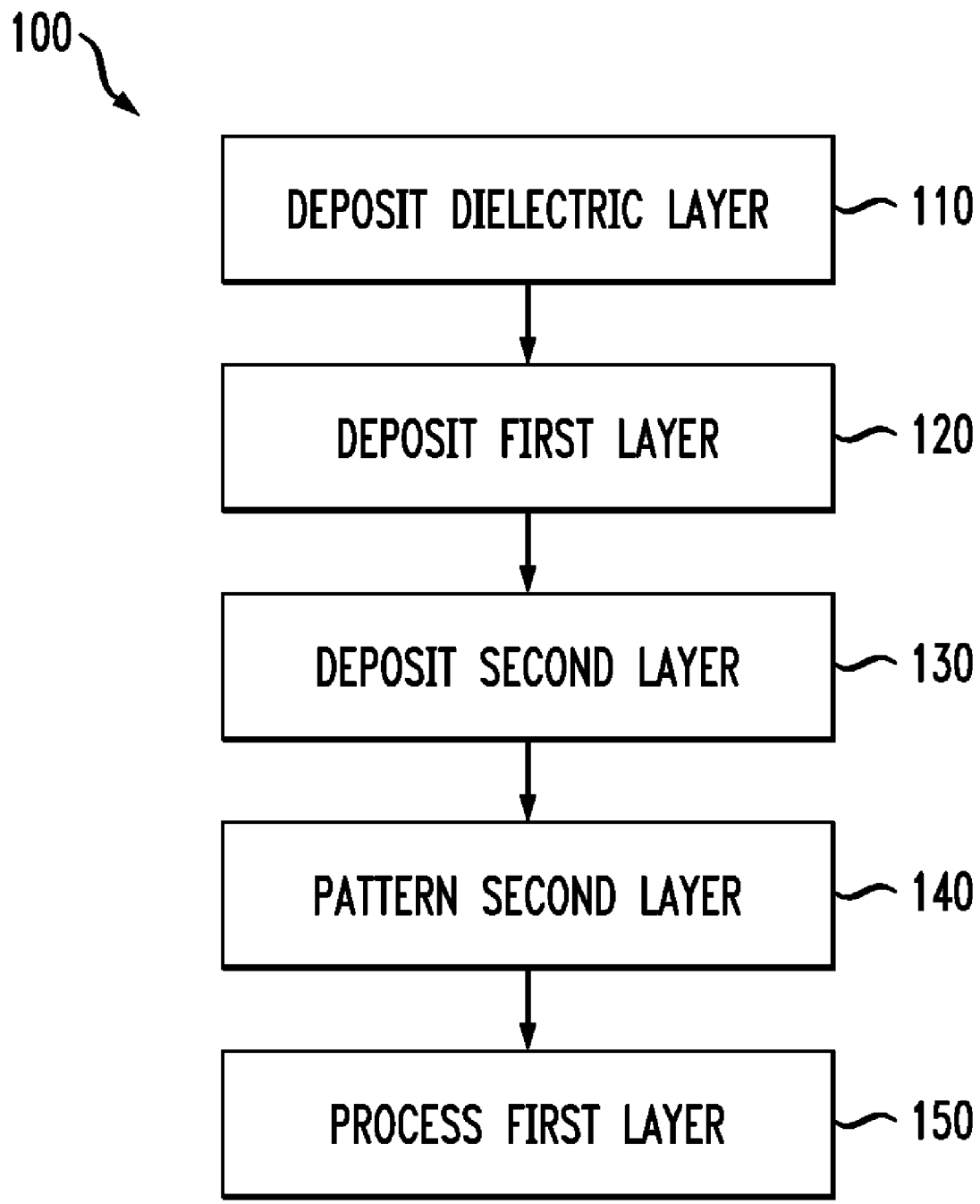
FIG. 1 shows a flow chart of a method in accordance with an illustrative embodiment of the invention for forming tubular objects.

To illustrate aspects of the invention, an exemplary method 100 for forming a matrix of tubular objects on a semiconductor substrate will now be described. FIG. 1 shows a flow chart of this method. FIGS. 2A-2H show sectional views and plan views of a film stack at various stages in the FIG. 1 method.

The illustrative process begins with a substrate 210. In step 110 of the method 100, a dielectric layer 220 is deposited on the substrate, resulting in the film stack shown in FIG. 2A. Subsequently, in step 120, a first layer 230 is deposited on the dielectric layer. These steps result in the film stack shown in FIG. 2B.

In the illustrative embodiment, the substrate 210 preferably comprises silicon or some other suitable semiconductor material, while the dielectric layer 220 comprises silicon oxide (e.g., $SiO_x$) or another dielectric material such as silicon nitride (e.g., $Si_xN_y$) or silicon oxynitride (e.g., $SiO_xN_y$). The dielectric layer may be deposited by conventional chemical vapor deposition (CVD) or thermal growth techniques, both of which are used extensively in the semiconductor industry. The first layer 230, in contrast, preferably comprises a combination of tantalum, silicon, and nitrogen such as TaSiN. TaSiN is frequently used in conventional semiconductor devices as a diffusion barrier for copper interconnects. It may be deposited by the physical vapor deposition (PVD) of a tantalum-silicon target in an argon-nitrogen ambient. Preferred compositions for the TaSiN in the present embodiment are about 20 atomic percent (at. %) to about 40 at. % tantalum, about 10 at. % to about 30 at. % silicon, and about 30 at. % to about 60 at. % nitrogen, although other compositions would still come within the scope of the invention.

Figure 2A:
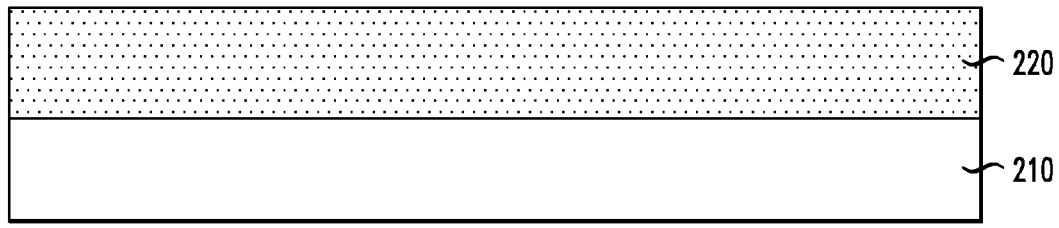
FIGS. 2A-2H show sectional views and plan views of a film stack at various stages in the FIG. 1 method.
Figure 2B:
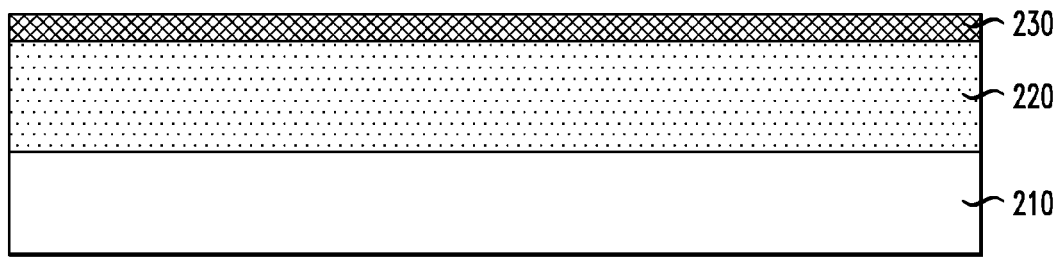
Figure 2C:
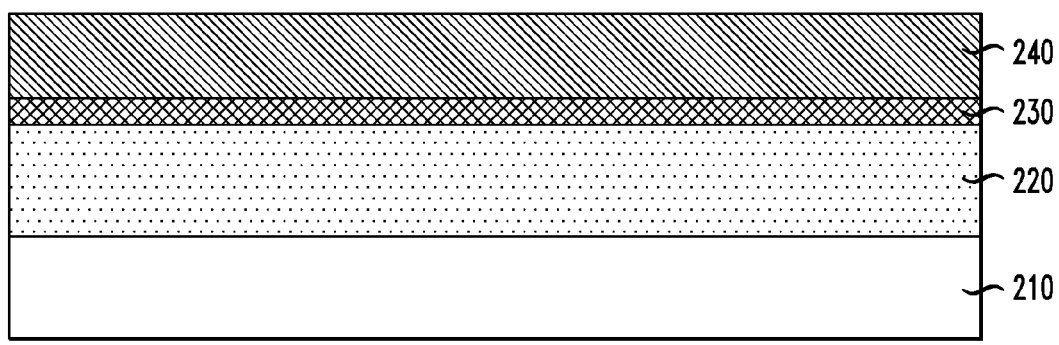

In step 130, a second layer 240 is deposited on the first layer 230, resulting in the film stack shown in FIG. 2C. The second layer preferably comprises a photoresist adapted for use with electron beam lithography. This photoresist may, for example, comprise the NEB-22 negative tone photoresist commercialized by Sumitomo Chemical Co., Ltd. of Tokyo Japan. This resist comprises 1-methoxy-2-propanol acetate ($C_6H_{12}O_3$) as one of its active ingredients.

Figure 2D:
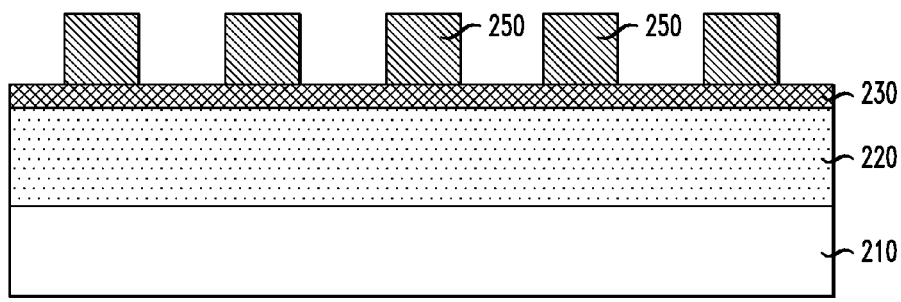
Figure 2E:
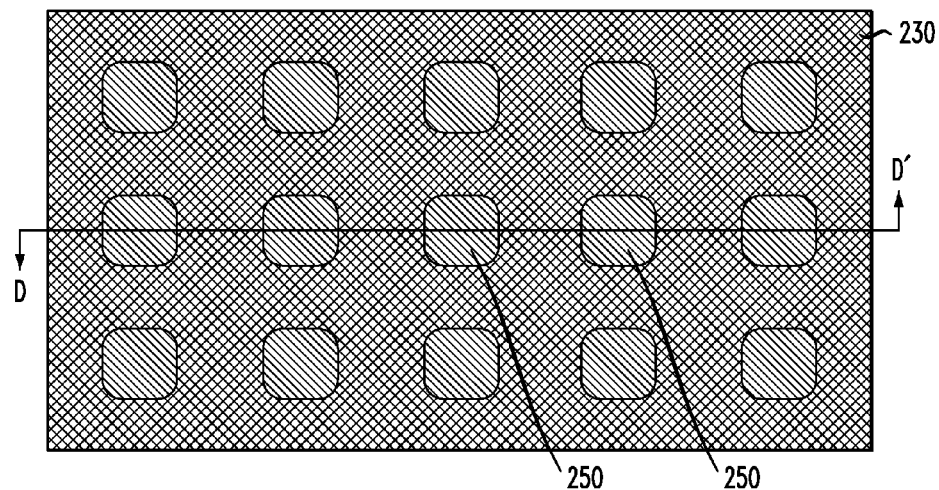

In step 140, the second layer 240 is patterned to form raised features 250 on the first layer 230. A sectional view of the resultant film stack is shown in FIG. 2D and a plan view of the film stack is shown in FIG. 2E. If the second layer comprises a photoresist, this step is preferably performed by lithography. For example, when using NEB-22 for the second layer, the exposure of the photoresist will be by electron beam lithography. Development of the photoresist after exposure is performed in a conventional manner. It may be performed, for example, by baking the photoresist (e.g., about 80 degrees Celsius for about two minutes) and developing it in a commercially available developer solution such as Microposit™ MF-321 Developer from Rohm and Haas of Philadelphia, Pa. USA (previously Shipley).

In the illustrative embodiment, the raised features 250 have a cross-sectional shape (i.e., a shape in a plane parallel to the plane defined by the uppermost surface of the dielectric layer 220) that is rectangular with rounded edges. Nevertheless, this cross-sectional shape is merely illustrative and other cross-sectional shapes (e.g., circular, square, oval, hexagonal, octagonal, etc.) may also be utilized. As will be described in greater detail below, the height, thickness, and cross-sectional shape of the raised features will directly affect the ultimate height, width, and cross-sectional shape of the tubular objects. Therefore, in practice, these properties of the raised features will preferably be chosen with the ultimate application for the tubular objects in mind.

Figure 2F:
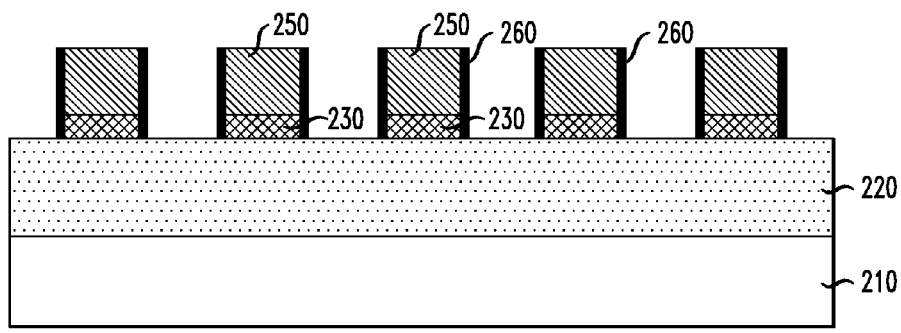

In step 150, the first layer 230 is further processed such that components of the first layer deposit on the one or more sidewalls of the raised features 250. This sidewall deposition forms the tubular objects 260, as shown in FIG. 2F. When using TaSiN for the first layer and NEB-22 for the second layer 240, for example, this step may be performed by anisotropically etching the film stack using reactive ion etching (RIE). The RIE preferably comprises halogen-containing reactants such as chlorine (e.g., $Cl_2$) or hydrogen bromide (e.g., HBr). The halogen-containing reactants may optionally be mixed with an inert gas such as argon and other additives such as those containing oxygen, nitrogen, carbon, or combinations thereof. In the present embodiment, the anisotropic etching process is allowed to proceed until the exposed portions of the first layer are completely removed from the uppermost surface of the dielectric layer 220. Nevertheless, this is not necessary. Instead, in a different embodiment, the etch may be performed such that portions of the exposed first layer remain after processing.

Once formed, the composition of the tubular objects 260 will depend on the extent to which the first layer merely deposits on the sidewalls of the raised features 250 as well as the extent to which the components of the first layer deposit on the sidewalls of the raised features and react with these sidewalls and the reactants in the anisotropic etch process.

Figure 2G:
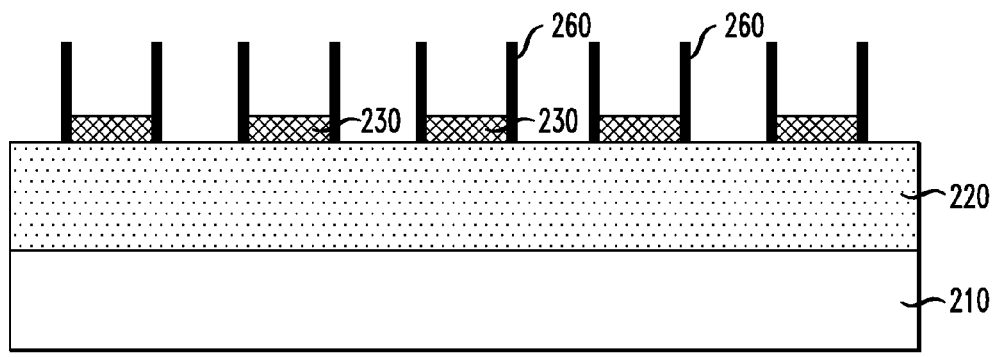
Figure 2H:
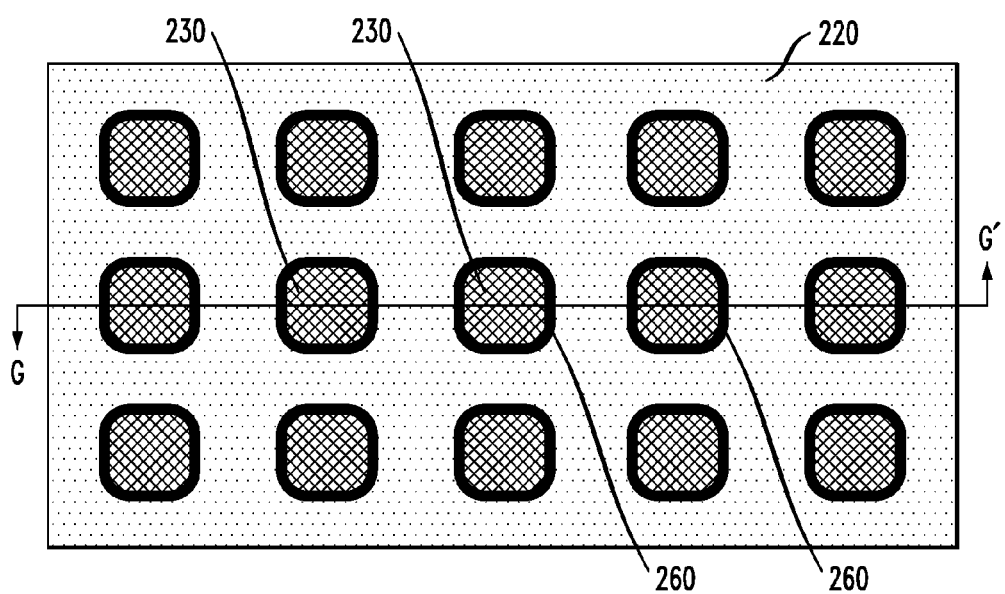

Removing the raised features 250 results in the tubular objects 260 and film stack shown in FIGS. 2G and 2H. If the raised features comprise a photoresist like NEB-22, this step may be performed by a conventional photoresist chemical stripping process that will be familiar to one skilled in the art.

Once formed to the extent shown in FIGS. 2G and 2H, the tubular objects 260 may optionally be further processed depending on the application. The remaining portions of the first layer 230 located at the bottoms of the tubular objects may, for example, be removed by a wet chemical etching step or by RIE. Alternatively or additionally, the tubular objects may be removed from the remainder of the film stack for use elsewhere.

The above-described method embodiment 100 allows the tubular objects 260 to be mass produced. Moreover, methods in accordance with aspects of the invention allow the placement and physical characteristics of the resultant tubular objects to be precisely controlled. As indicated above, the tubular objects formed by the illustrative method form on the sidewalls of the raised features 250 and therefore form wherever a raised feature is patterned in step 140. In other words, the tube-shape objects are, in effect, "self-aligned" to the raised features. As a result, tubular objects with a desired arrangement may be formed on the dielectric layer 220 by simply patterning the raised features so that they are distributed on the dielectric layer with that desired arrangement.

In addition, it will be observed that the tubular objects 260 also take on the height and cross-sectional shape of the raised features 250. This, in turn, allows the height and cross-sectional shape of the tubular objects to be readily adapted to a particular application. Thickening the second layer 240 and, in so doing, increasing the height of the raised features, results in tubular objects with greater height. Likewise, changing the cross-sectional shape of the raised features changes the cross-sectional shape of the fabricated tubular objects. In fact, the sidewalls of the raised feature may even be tapered (i.e., not vertical in relation to the uppermost surface of the dielectric layer) in order to produce tubular objects with widths that change as a function of height.

The sidewall thicknesses of the tubular objects 260 may also be adapted to a particular application. The sidewall thicknesses of the tubular objects are dependent on the extent to which the first layer 230 is processed in step 150. Thickening the first layer allows additional processing and, in turn, additional sidewall deposition and thicker sidewalls.

Tubular objects with square cross-sectional shapes, minimum widths less than about 175 nanometers (nm), heights of about 200 nm, and sidewall thicknesses of less than about ten nm were readily formed with the method 100 using TaSiN as the first layer and NEB-22 as the second layer. Advantageously, these tubular objects showed a strong resistance to various wet chemical etchants. For example, these objects withstood immersion in a solution comprising 100:1 diluted hydrofluoric acid for about three minutes without becoming detached from the dielectric layer and without dissolving significantly. Moreover, the tubular objects withstood exposure to various dry etches. Exposures to dry etch recipes comprising different combinations of oxygen, chlorine, and carbon tetrafluoride under various pressures did not seem to have deleterious effects on the tubular objects as determined by scanning electron microscopy. Tubular objects formed in this manner, therefore, seem quite resistant to damage from subsequent etching steps.

Tubular objects were also successfully formed using TaSiN as the first layer and an optical photoresist as the second layer. More particularly, for these trials, the second layer comprised UVN™ 30 (60-95% propylene glycol monomethyl ether acetate), a negative deep ultra-violet optical photoresist commercially available from Rohm and Haas of Philadelphia, Pa. USA. However, tubular objects formed in this manner had different physical characteristics than those formed using NEB-22. The tubular objects formed using the UVN 30, for example, were removed from the uppermost surface of the dielectric layer by immersion in 100:1 diluted hydrofluoric acid for only one minute. This result would seem to indicate that the choice of the second material has a profound effect on the physical characteristics of the tubular objects formed thereon.

Although illustrative embodiments of the present invention have been described herein with reference to the accompanying figures, it is to be understood that the invention is not limited to those precise embodiments, and that various other changes and modifications may be made to these embodiments by one skilled in the art without departing from the scope of the appended claims.

What is claimed is:

1. A method of forming a tubular object, the method comprising the steps of:
   providing a first layer;
   forming a second layer on the first layer;
   patterning the second layer to form a raised feature with one or more sidewalls;
   processing the first layer such that material of the first layer is deposited on the one or more sidewalls of the raised feature, wherein a layer of material deposited on the one or more sidewalls of the raised feature forms a tubular object that surrounds the raised feature; and
   removing the raised feature from within the surrounding tubular object so that at least a portion of the tubular object becomes freestanding.

2. The method of claim 1, wherein the first layer comprises tantalum silicon nitride.

3. The method of claim 1, wherein the step of forming the second layer comprises depositing a photoresist.

4. The method of claim 3, wherein the photoresist comprises methoxy-propanol acetate.

5. The method of claim 3, wherein the photoresist comprises a photoresist adapted for electron beam lithography.

6. The method of claim 3, wherein the photoresist comprises a photoresist adapted for optical lithography.

7. The method of claim 1, wherein the step of patterning the second layer comprises electron-beam lithography.

8. The method of claim 1, wherein the step of patterning the second layer comprises optical lithography.

9. The method of claim 1, wherein the step of patterning the second layer comprises patterning the second layer such that the one or more sidewalls of the raised feature are tapered.

10. The method of claim 1, wherein the step of processing the first layer comprises etching the first layer.

11. The method of claim 1, wherein the step of processing the first layer comprises dry etching the first layer.

12. The method of claim 1, wherein the step of processing the first layer comprises dry etching the first layer with a halogen-containing reactant.

13. The method of claim 1, wherein the method comprises semiconductor processing techniques.

14. A tubular object formed by a method comprising the steps of:
   providing a first layer;
   foaming a second layer on the first layer;
   patterning the second layer to form a raised feature with one or more sidewalls;
   processing the first layer such that material of the first layer is deposited on the one or more sidewalls of the raised feature, wherein a layer of material deposited on the one or more sidewalls of the raised feature forms a tubular object that surrounds the raised feature; and
   removing the raised feature from within the surrounding tubular object so that at least a portion of the tubular object becomes freestanding.

15. The tubular object of claim 14, wherein the first layer comprises tantalum silicon nitride.

16. The tubular object of claim 14, wherein the step of forming the second layer comprises depositing a photoresist.

17. The tubular object of claim 14, wherein the step of patterning the second layer comprises lithography.

18. The tubular object of claim 14, wherein the step of processing the first layer comprises etching the first layer.

19. An apparatus comprising a tubular object, the tubular object formed by a method comprising the steps of:
   providing a first layer;
   forming a second layer on the first layer;
   patterning the second layer to form a raised feature with one or more sidewalls;
   processing the first layer such that material of the first layer is deposited on the one or more sidewalls of the raised feature, wherein a layer of material deposited on the one or more sidewalls of the raised feature forms a tubular object that surrounds the raised feature; and
   removing the raised feature from within the surrounding tubular object so that at least a portion of the tubular object becomes freestanding.

* * * * *